United States Patent [19]

Hollis et al.

[11] Patent Number: 4,918,363
[45] Date of Patent: Apr. 17, 1990

[54] ACTUATOR FOR TVRO PARABOLIC ANTENNA

[75] Inventors: Russell E. Hollis; Paul R. Hollis, both of Dayton, Ohio

[73] Assignee: Venture Mfg. Co., Dayton, Ohio

[21] Appl. No.: 252,381

[22] Filed: Sep. 30, 1988

[51] Int. Cl.$^4$ .................... H02H 5/00; H01Q 3/08
[52] U.S. Cl. ................. 318/626; 318/254; 318/475; 318/266; 310/83; 74/813 L; 343/765; 343/766; 343/882
[58] Field of Search ............. 318/626, 696, 632, 648, 318/649, 640, 266, 254, 282, 475, 283, 362, 269, 273; 343/757, 714, 760, 766, 765, 882, 903, 840, 872, 915, 912, 880; 74/469, 813 L, 816, 567; 192/141; 310/82, 83, 80

[56] References Cited

U.S. PATENT DOCUMENTS

| | | | |
|---|---|---|---|
| 2,438,545 | 3/1948 | Davidson | 310/83 X |
| 2,479,019 | 8/1949 | Ochtman | 310/83 X |
| 2,480,212 | 8/1949 | Baines | 310/83 X |
| 2,769,430 | 11/1956 | Geyer | 310/83 |
| 3,038,352 | 6/1962 | Murphy | 310/83 X |
| 4,128,361 | 12/1978 | Golwas et al. | 74/813 L X |
| 4,607,180 | 8/1986 | Stoody | 310/83 X |
| 4,617,572 | 10/1986 | Hugo | 343/882 X |
| 4,663,635 | 5/1987 | Wu | 343/765 |
| 4,672,385 | 6/1987 | Prindle | 343/766 |
| 4,691,207 | 9/1987 | Timineri | 343/766 |
| 4,763,219 | 8/1988 | Nakamura | 318/266 X |
| 4,821,043 | 4/1989 | Leavitt | 343/766 X |
| 4,841,309 | 6/1989 | Burr | 343/766 |

Primary Examiner—William M. Shoop, Jr.
Assistant Examiner—Paul Ip
Attorney, Agent, or Firm—Jerome P. Bloom

[57] ABSTRACT

Power transmission and actuator apparatus especially advantageous in application to outdoor antennas, particularly TVRO parabolic antennas, to be operated by remote control, comprises a tub-shaped receptacle including a base having a peripherally encompassing relatively projected wall structure defining therewith a cavity, the major extent of the opening to the cavity being bridged by a releasably attached plate mounting a terminal strip adapted for connection thereto of a remote source of electrical energy, the base mounting a first integrated adapter for mounting a drive motor and a second for mounting an actuator assembly in a manner to provide for an inherent evacuation of water from each thereof during its use. The plate commonly mounts a perpendicularly related shaft and a multiplicity of control elements and the shaft has thereon a slip fit output gear in mesh with further gear means intermediate said plate and the base of the receptacle.

10 Claims, 5 Drawing Sheets

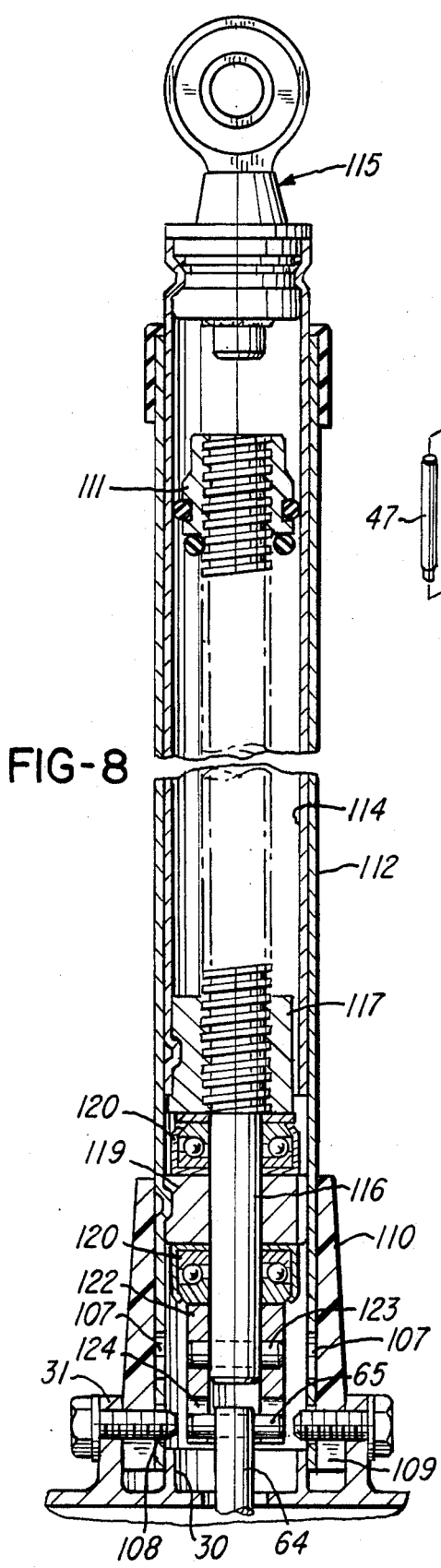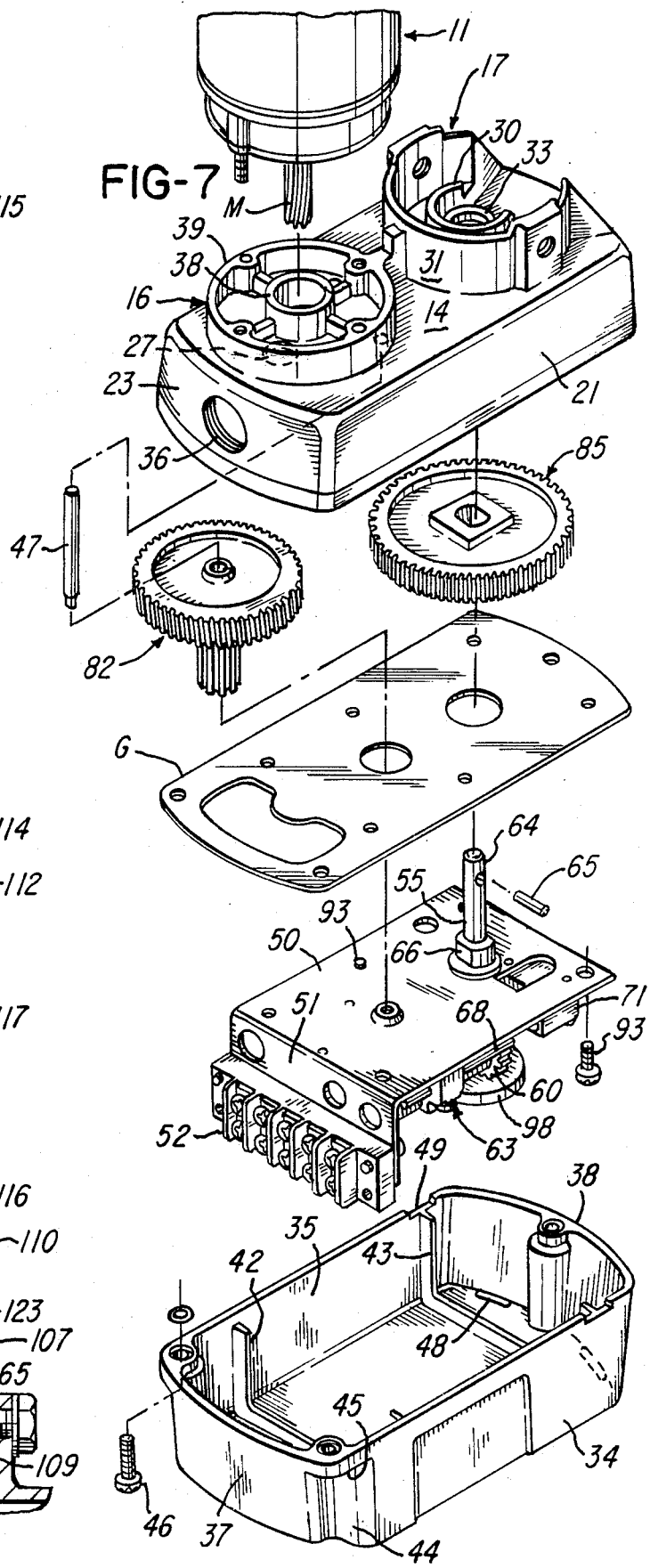

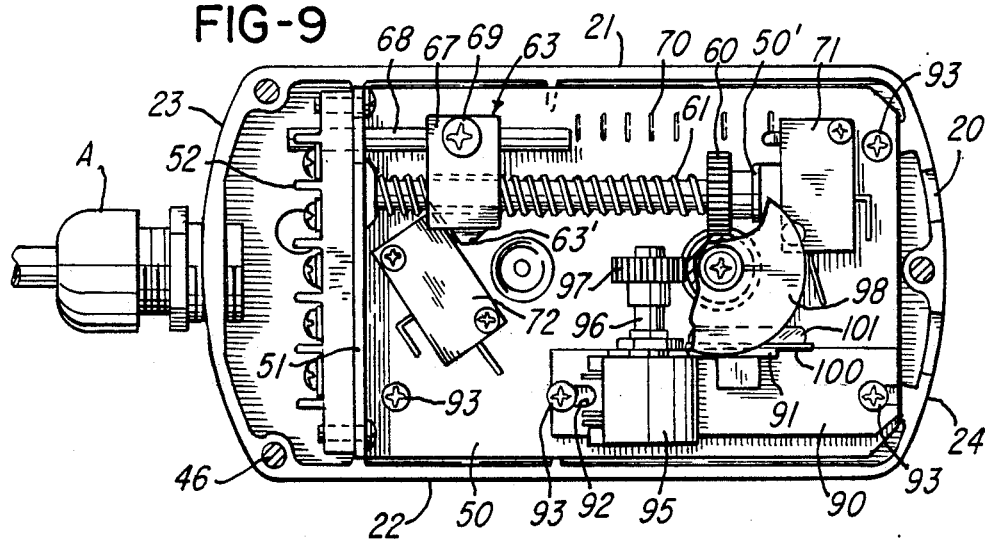
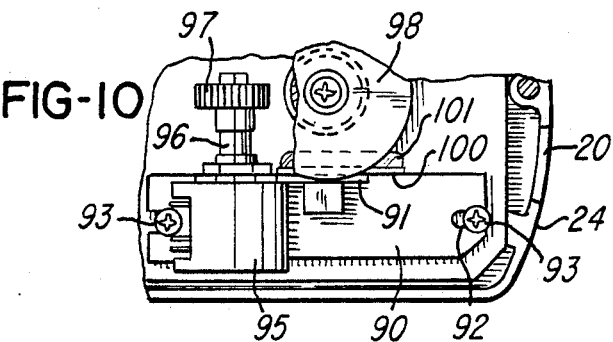
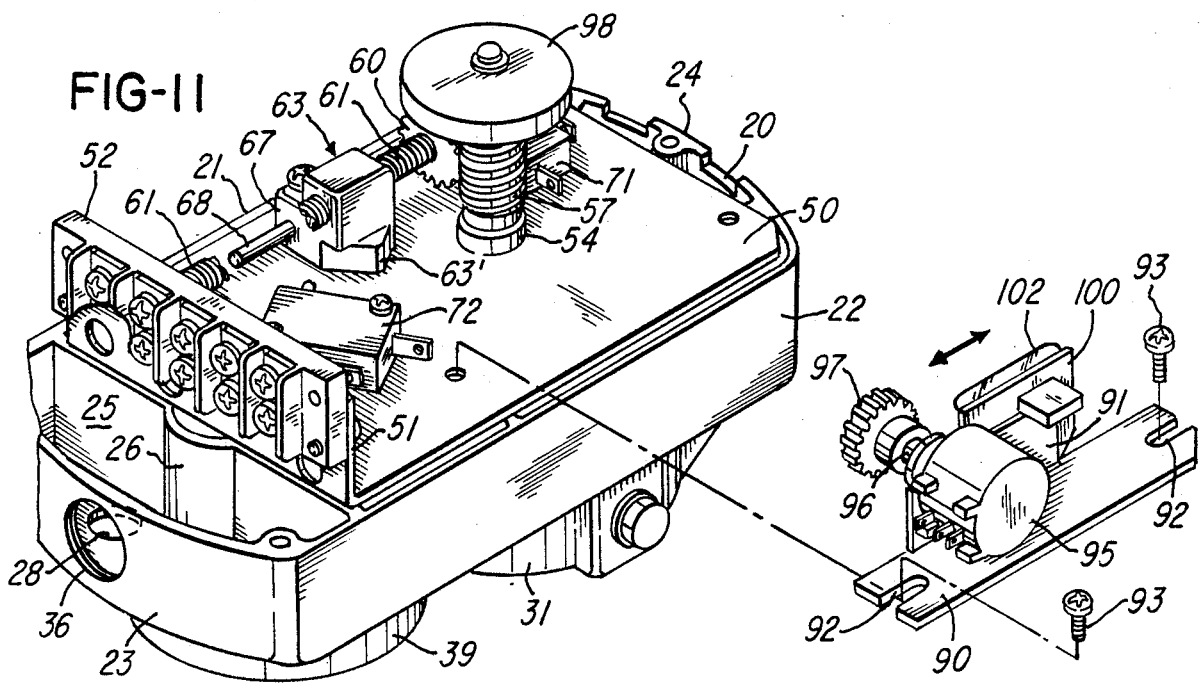

ACTUATOR FOR TVRO PARABOLIC ANTENNA

BACKGROUND OF THE INVENTION

This invention relates to an antenna actuator having a new and significantly improved construction which is particularly advantageous for use in application to any antenna operated in an outdoor environment, such as a TVRO parabolic antenna.

Actuators of the prior art which have been heretofore applied to similar purpose have exhibited various operating and maintenance problems in their use. Such problems have been derivative in many instances from the nature of their basic overall construction which has been such to make it extremely difficult to readily or reasonably reach and replace or repair critical component parts. Other problems found to exist in their use have been evidenced by the fact that during the course of a limited period of their constant exposure to the elements moisture, dirt and/or insects which have invaded their interior have been the source of interior deterioration of parts, an unacceptable reduction of their efficiency and, in some instances, an unreasonably early breakdown in their operation. An additional problem has been the occasions of structural weakness evidenced in the construction of embodiments of the prior art.

All the foregoing problems which have been variously exhibited on numerous occasions in use of the actuators of the prior art have been alleviated and/or overcome by reason of the improvements of the present invention, embodiments of which are comparatively simple and relatively economical to fabricate, easy to disassemble and reassemble, exhibit minimal need for maintenance and most efficient and satisfactory in use. In addition to these benefits embodiments of the present invention provide an actuator assembly which is most statically and dynamically balanced in use thereof.

The invention will be herein described in detail by way of an illustrative embodiment thereof which is only by way of example and not to to construed as limiting, either as to its particular form, configuration or application.

Neither applicants nor any person substantively involved in the preparation of this disclosure have any knowledge of any prior art which exhibits any of the points of novelty of the present invention.

SUMMARY OF THE INVENTION

The invention features apparatus for linking a source of power and a device to be actuated comprised of power transmitting means and means to limit and control the period and extent of the transmission of said power wherein control means and power transmitting means are commonly mounted on a single plate wherein each individual component thereof is fully exposed and individually accessible for easy and quick inspection when needed and said plate provides support for power transmission means of the device of which it forms a part.

The invention further features embodiments thereof providing power transmission units including controls for limiting, selectively the duration and increments of the transmission of power and said transmission units feature a shell-like receptacle wherein a single plate effectively mounts at its respectively opposite faces all those components necessary for the control and operation of an actuator tube assembly applied in connection with said receptacle.

A further embodiment of the invention comprises a shell-like housing formed of two receptacles each of which defines a cavity and said receptacles are releasably joined to form a hollow, generally rectangular chamber, the cavity of one of said chambers having a major extent of the opening thereto bridged by a single plate supporting gear means, said housing mounting in connection therewith an actuator assembly at its exterior and said plate mounting an output shaft to which is slip fit a portion of said gear means and said output shaft has one end thereof projected through an opening in said housing to engage with and in a releasable coupled relation to the actuator of said assembly and said plate means mounting individually accessible components interrelated with each other and said output shaft to control the transmission of power through said shaft in accordance with the setting thereof and signals from a remote source of control.

The invention also provides a new and improved gear head assembly for interposing between and to commonly mount an actuator tube assembly and its drive motor and commonly link them to provide transmission of power from the motor to the actuator assembly wherein said gear head assembly comprises a housing apertured to provide a path therein for such moisture or condensation as is created within said motor in an outdoor usage thereof to be simply directed over interior wall surfaces of said housing to flow and be evacuated from said housing by way of very small slots defined therein in a limited area of the wall structure thereof. In another embodiment the housing of the gear head assembly is formed of two mating parts defining a single chamber wherein there are relatively minute narrow slots at a joint between said parts, the form of which slots in such to virtually preclude the blocking thereof and entrance therethrough to the interior of the housing of insects or other undesirable elements. A more preferred form of such embodiment includes structure dictating a continuing evacuation of water or moisture from both said motor and said actuator tube assembly during their exposure to an outdoor environment. A further improved form of this embodiment features a new and improved adapter for use with an actuator tube assembly which enables the use of actuator tubes of different diameter in connection with the same gear head.

Another embodiment of the invention features a new and improved gear head assembly for interposing between and to commonly mount an actuator tube assembly and its drive motor and commonly link them to provide transmission of power from the motor to the actuator assembly wherein said gear head assembly comprises a receptacle wherein the operative components thereof are commonly provided with support by a single element and means are provided to mount and secure the actuator tube to said motor to the actuator assembly wherein said gear head assembly comprises a receptacle wherein the operative components thereof are commonly provided with support by a single element and means are provided to mount and secure the actuator tube to said receptacle by means of a conical shell providing an adapter so interconnected to and with the base of the tube assembly in a manner to integrate the housing with said assembly and in the process thereof lend substantially increased strength and resistance to damage of said receptacle and its contents. In a most preferred form of this embodiment the connection of the actuator tube assembly to said receptacle is such to inherently provide for continuous evacuation of any moisture invading said assembly when it is used in an outdoor environment.

A primary object of the invention is to provide a new and improved actuator, particularly advantageous for use in an outdoor environment embodiments of which as compared to the prior art are comparatively simple and relatively economical to fabricate, easy to disassemble and reassemble, exhibit minimal need for maintenance and are most efficient and satisfactory in use.

Another object is to provide a new and improved power transmission and control unit particularly advantageous in application to an outdoor antenna which is compact and dominated by a simple plate structure which affords a releasable mount and/or support for component controls thereof the construction of which is most simplistic and provides a compact package wherein all of the component parts thereof are easily accessible to individual inspection, maintenance and replacement, even in field environments. A further object is to provide such a power transmission and control unit on which a motor or its equivalent is directly mounted together with an actuator which directly links the motor with the actuator. A further object is to further provide said unit linking said motor and actuator which mount thereon in side by side relation wherein said unit includes a casing for the components thereof which are commonly disposed within said housing which is formed of two releasably interconnected separable parts which are shell-like in character and the simple removal of one of said parts provides a ready and direct accessibility to each of the operative controls included within said casing.

Another object is to provide a new and improved gear head assembly for interposing between and to commonly mount an actuator tube assembly and its drive motor and commonly link them to provide transmission of power from the motor to the actuator assembly wherein said gear head assembly comprises a housing apertured to provide a path therein for such moisture or condensation as is created within said motor in an outdoor usage thereof to inherently be directed over interior wall surfaces of said housing to flow and be evacuated from said housing by very small slots defined in a limited area of the wall structure thereof. A further object is to provide in such apparatus that the housing of the gear head assembly is formed of two mating parts defining a single chamber wherein there are relatively minute narrow slots at a joint between said parts, the form of which slots is such to virtually preclude the blocking thereof and entrance therethrough to the interior of the housing of insects or other undesirable elements. Another object is to provide such structure wherein a path is defined for continuous evacuation of water gaining entrance to both said motor and actuator tube assembly during their exposure to outdoor environments.

A further object is to provide for power transmission and control of such transmission a single flat plate formed to provide a link between a source of power and an actuator and to this end to commonly mount and provide for interrelation of the individual control elements which govern and limit the transmission of power to precisely define increments as dictated by remote signals and to particularly provide a mounting of each of said elements in a releasable manner and easily accessible to adjustment and maintenance thereof when needed.

An additional object is to provide a new and improved adapter for use with an actuator tube assembly which enables the use of actuator tubes of different diameter in connection with the same gear head.

Another object is to provide a new and improved gear head assembly for interposing between and to commonly mount an actuator tube assembly and its drive motor and commonly link them to provide transmission of power from the motor to the actuator assembly wherein said gear head assembly comprises a housing formed in two parts wherein the operative components thereof are commonly provided with support by a single element and means are provided to mount the actuator tube assembly in an adapter so interconnected to and with the base of the tube assembly in a manner to integrate the housing with said assembly and in the process thereof lend substantially increased strength and resistance to damage of said housing and said parts thereof. A similar object is to provide the connection of the actuator tube assembly to said housing in a manner to inherently provide for continuous evacuation of any moisture invading said assembly when it is used in an outdoor environment.

Another objecte is to provide apparatus possessing the advantageous features of construction, the inherent meritorious characteristics and the means and mode of operation thereof herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings wherein;

FIG. 7 is an exploded view of the gear head portion of the illustrated embodiment;

FIG. 8 is a cross sectional view of the actuator assembly shown in FIG. 2;

FIG. 9 is a view taken on line 9—9 of FIG. 3;

FIG. 10 is a fragmentary view of the apparatus of the invention illustrating a modification of that which is shown in FIG. 9; and FIG. 11 is a perspective, partially exploded view of the gear head of the invention wherein one half of its housing is removed for convenience of disclosure of internal parts thereof.

Like parts are identified by like numerals in the respective views of the drawings.

Figure 1:
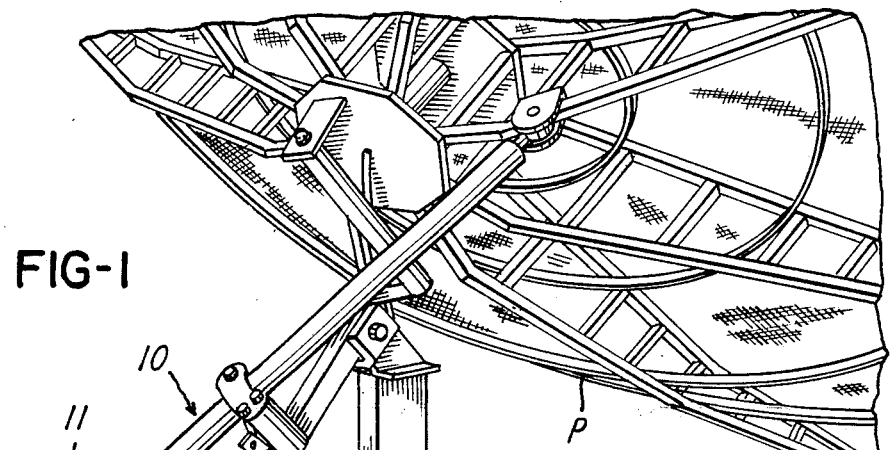
FIG. 1 is a perspective view of an embodiment of the invention applied to a parabolic TVRO antenna.
Figure 2:
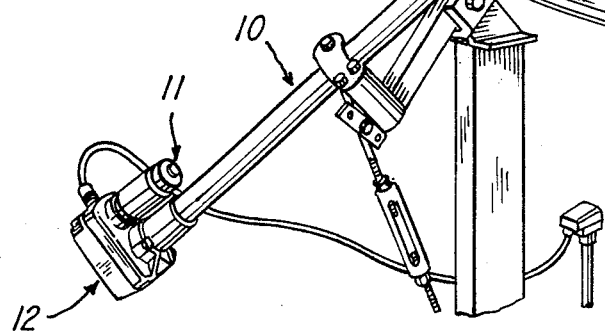
FIG. 2 is a perspective view of said embodiment.
Figure 3:
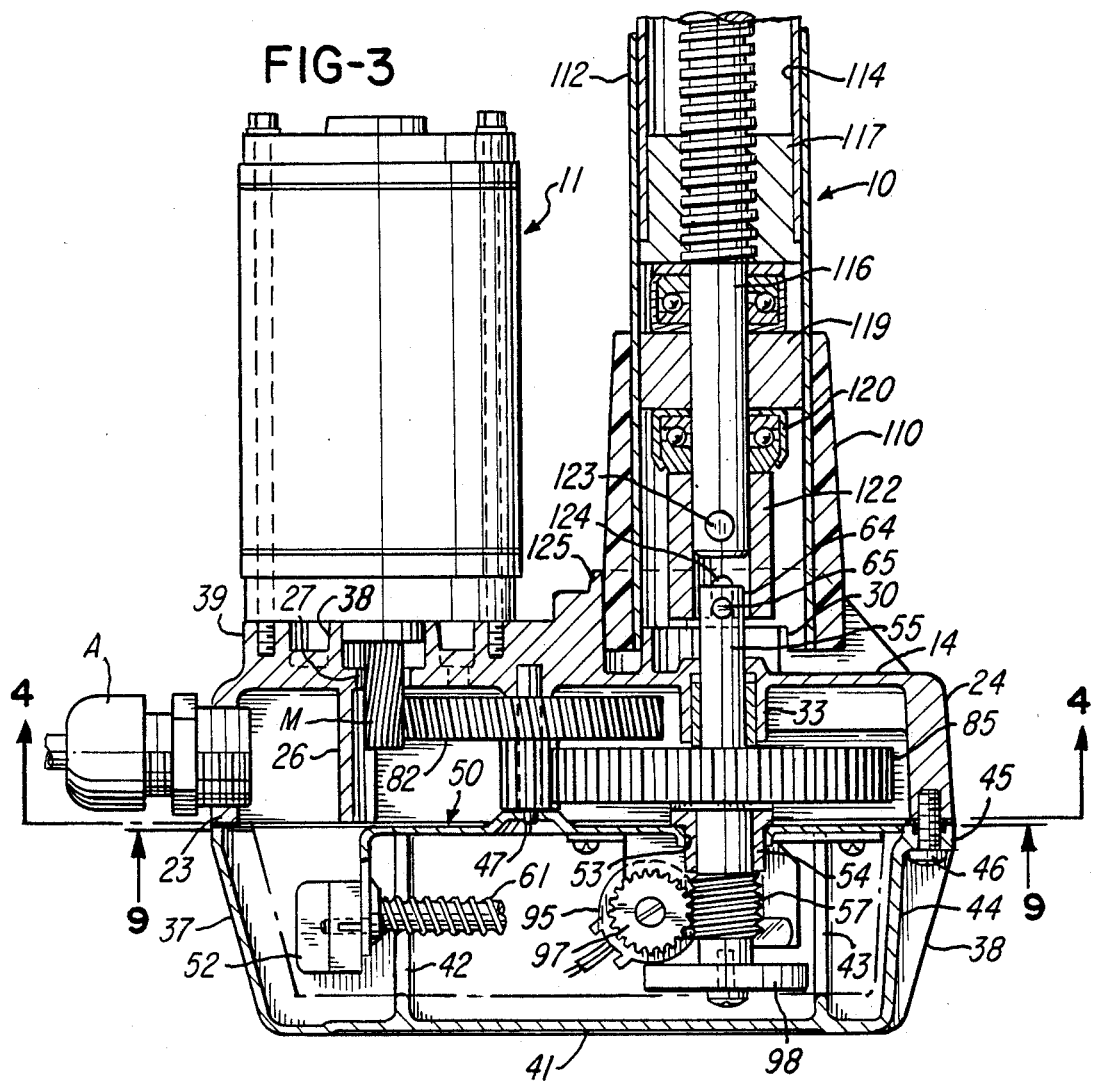
FIG. 3 is a view taken on line 3—3 of FIG. 2.
Figure 4:
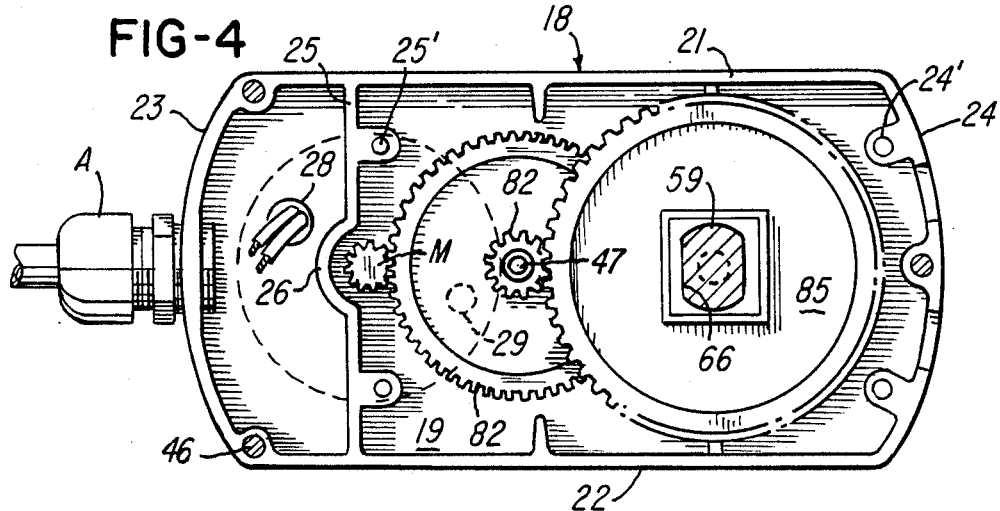
FIG. 4 is a view taken on line 4—4 of FIG. 2.
Figure 5:
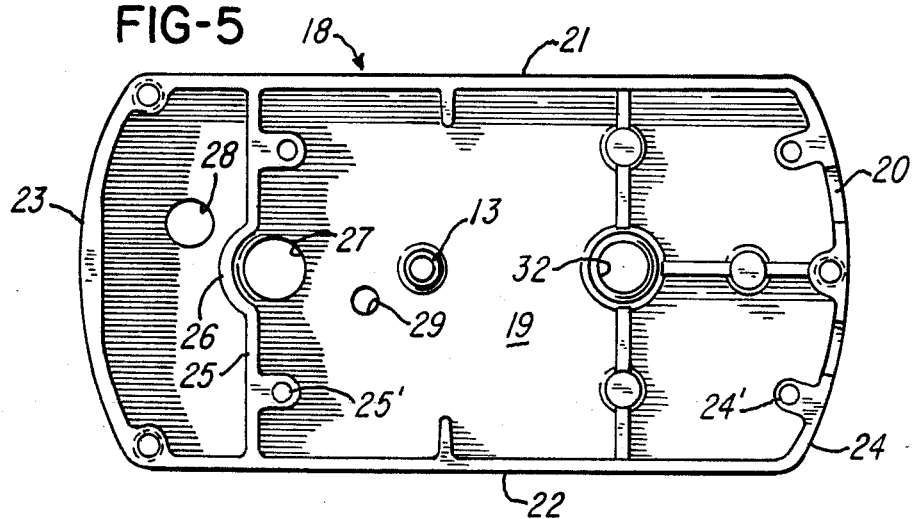
FIG. 5 is a view of the interior of the receptacle forming part of the gear head housing of the embodiment illustrated in FIG. 4.
Figure 6:
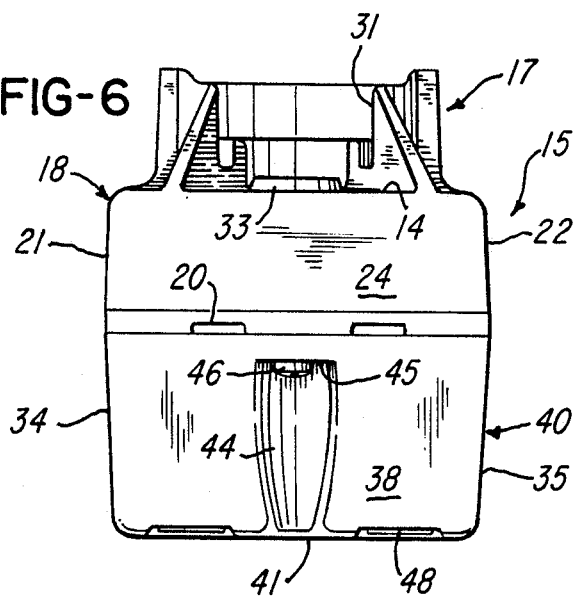
FIG. 6 is an end view of the gear head housing.

The embodiment of the invention in the drawings is demonstrated as applied to an actuator used in connection with and for the selective adjustment of an outdoor TVRO parabolic antenna. This actuator comprises an actuator tube assembly 10, its drive motor 11 and a gear head 12.

Head 12 mounts actuator assembly 10 and its drive motor 11 in a relatively closely spaced parallel relation, perpendicular to what may be considered the upper surface portion 14 of its generally rectangular shell-like housing 15. Surface 14 is basically planar but distinguished in this instance by two longitudinally spaced, integrally formed, perpendicularly related, outwardly projected structures 16 and 17 which respectively provide for a secure, easy and quick mount thereto of motor 11 and assembly 10. Housing 15 is in this instance formed of two aluminum castings and the shell which they define not only contains power transmission means but also all those controls which govern the operation of the actuator.

That casting which provides the upper part of housing 15, is an integrally formed, thin-walled, oblong, generally rectangular tub-shaped shell 18. Shell 18 which is inverted in use comprises, in this attitude, an uppermost rectangular plate-like base 19 having an integrated peripherally bounding wall structure which depends therefrom in a dependent generally perpendicular relation thereto. The oppositely facing front and back wall portions 21 and 22 of this dependent wall structure run the length of the longitudinally extending side edges of base 19, which exhibit its major dimension, are essentially parallel but have a slight divergency. The longitudinal extremities of base 19 are identically curved, the curves thereof being symmetrical, relatively flat and reflected in a corresponding curve of each of the end wall portions 23,24 of shell 18.

The dependent extremities of front and back wall portions 21,22 and end wall portions 23,24 of shell 18 mutually define a plane which is parallel to that defined in and by base 19 and its outer surface portion 14 and so configured to precisely match that plane defined by the projected extremities of the side and end walls which bound the cavity defined by the interior wall surface of the tub-shaped shell 40 defined by the other of the aforementioned castings. Note that the depth and divergency of the side and end walls of shell 40 is greater than that of the corresponding wall portions of shell 18.

At the corners of shell 18 which laterally bound end wall 23 the inner surface of each thereof has an integrated inwardly directed radial projection which is coextensive therewith in depth and distinguished by a tapped blind bore directed inwardly of its outer extremity in a line perpendicular to base 19.

Within the cavity defined by the inner surface of tub-shaped shell 18 is a transversely disposed partition 25 which bridges, is integrally connected with and perpendicular to the inner surfaces of base 19 and side walls 21 and 22 and located in an adjacent spaced relation to end wall 23, the latter of which has a relatively large central aperture 36. Partition 25 has a planar configuration except for a laterally centered portion 26 of its length which extends the depth thereof, is uniformly arcuate in transverse section, projects in the direction of end wall 23, in direct alignment with aperture 36, and peripherally bounds almost 180 degrees of the circumference of an aperture 27 formed in base plate 19, to the side thereof facing end wall 24. Formed integral with the face of partition 25 remote from end wall 23 are two rib-like projections extending the depth thereof which are located between and equidistant from side wall 21 and 22 respectively. Each of these ribs have a tapped bore 25' directed inwardly of its outermost end and extending perpendicular to base 19.

Aperture 27 opens through the surface 14 of base 19 where it is rimmed by the closely spaced base of a concentrically positioned tubular cylindrical boss 38 having uniform inner and outer diameters and a short vertical extent. Boss 38 is integrated with base 19, perpendicular thereto and positioned within and in radially spaced relation to a further similarly oriented concentrically positioned wall structure 39 the base of which is also integrally connected to base 19. Wall structure 39 has the same vertical extent as boss 38 but differs in that it has a radial thickness which is greater and its inner wall surface is provided with four integrally formed radial rib-like projections which are coextensive therewith in axial length. Directed inwardly of the outer end of each of these ribs, in a line perpendicular to base 19 is a tapped blind bore. Four shallow ribs integrated with base surface 14 extending radially from and outward of the base end of boss 38 at points 90 degrees apart are respectively joined to and integrated with wall structure 39. These ribs define four quadrants between wall structures 38 and 39 directed through the base surface of one of which, immediately of end wall 23, is an aperture 28. Directed through the surface 14 of base 19 within an opposite quadrant is a smaller aperture 29. The wall structures 38 and 39, those portions of base 19 bounded thereby and the apertures and bores therein provide in their composite for mount 16 and an automatic beneficial maintenance of motor 11.

As seen within the cavity defined thereby, shell 18 has the aperture 28 in base 19 located in an adjacent offset relation to the apex of partition portion 26 and positioned radial to aperture 27, to the side of partition 25 adjacent end wall 23. Aperture 29 is located beyond aperture 27 and the side of partition 25 remote from end wall 23 as well as short of and in a longitudinally spaced laterally offset relation to a very short small diameter tubular projection 13 integral with and perpendicular to the inner surface of base 19. Projection 13 is laterally centered between side wall portions 21 and 22 of shell 18 and defines the entrance to a blind bore or socket in base 19 which is coaxial therewith and extends to a radially outermost portion of the base of motor mount 17. A pivot pin 47 one end of which is inserted in a press fit relation to said socket and tubular projection 13, which forms an extension thereof, is thereby mounted in a perpendicularly projected relation to base 19 and serves to mount, for rotation thereon, a compound idler gear including a pinion 82. Note that the projected extremity of pin 47 is reduced as to its diameter to produce thereon an outwardly facing annular shoulder.

Diametrically aligned with and spaced longitudinally from projection 13 and aperture 27 is an additional aperture 32 in base plate 19 bounded by a tubular boss 33 which is perpendicular to base 19 and lined by a tubular bearing ring. The major portion of the axial extent of boss 33 projects inwardly of base 19 while a limited portion thereof projects outwardly therefrom and perpendicular to a planar portion of surface 14 central to the mount 17 for actuator tube assembly 10.

The portion of boss 33 above surface 14 positions within and in an adjacent, radially spaced, concentric relation to a pair of radially spaced wall structures 30 and 31 which define therewith the mount 17, project upwardly from and perpendicular to surface 14 and are themselves in a relatively adjacent spaced relation and bridged at their base by radially directed shallow ribs. Wall structures 30 and 31 are uniformly arcuate in transverse section, have an arcuate extent approaching 270 degrees, are formed integral with and projected outwardly from and perpendicular to surface 14 and have the ends thereof centered with reference to the adjacent end wall 24. The axial extent or depth of wall structure 31 is substantially greater than that of structure 30 and the ends of its arcuate extent have integrated outwardly divergent ribs which are triangular in elevation and have their upper edges downwardly inclined to merge with base 19 and its adjacent extremity, which merges within wall 24.

Within the cavity defined by shell 18 the inner surface portion of end wall 24 adjacent boss 33 has three radial rib-like projections 24' from its inner surface which are coextensive therewith in depth, parallel, equidistantly spaced and laterally centered. Directed inwardly of the outer end of each of the ribs in a line perpendicular to base 19 is a tapped blind bore. Ribs on the inner surface of base 19 extend radially from boss 33 to each of the side walls 21 and 22 to which they perpendicularly relate and to the central one of the ribs on end wall 24. End wall 24 is further distinguished by two laterally spaced very shallow rectangular notches 20 which are equidistant from the projected extremity of central rib 24' and equidistant from side walls 21 and 22.

Note should be taken from FIG. 1 of the drawings that surface portion 14 of shell 18 and housing 15 is not only uppermost but so inclined as to elevate that end portion thereof which mounts motor 11 with respect to its opposite end portion which mounts actuator assembly 10. The purpose and inobvious benefits thereof will be further described.

As indicated above, lower shell 40, as well as upper shell 18, is an integrally formed, thin-walled, oblong, generally rectangular tub-shaped structure. As these shells are interconnected in their relatively superposed relation to form housing 15 the rectangular longitudinally extended base 41 of shell 40 is remote from and parallel to base 19 of shell 18. Side walls 34,35 of shell 40 have a modest divergency as they rise upwardly from the parallel longitudinally extended opposite side edges of their base 41, the respective ends of which are identically curved to each define a relatively flat arc formed on a uniform radius. End walls 37,38 of shell 40 are also divergent, to a somewhat greater extent than side walls 34,35 and each thereof is transversely curved in the manner of the arcuate end of base 41 from which it projects. As noted previously, the projected edges of these side and end wall portions of shell 40 are co-planar and parallel to base 41.

The inner wall surface of shell 40 is distinguished by two generally U-shaped ribs 42,43 which are directed transversely thereof, the central portions of which extend crosswide of, project perpendicular to and upwardly from base 41 and the end portions of which identically relate to the inner surface of side wall portions 34,35 as they extend upwardly thereof to terminate at a point just short of and in spaced relation to the projected limits of the respective side walls. Ribs 42,43 are in longitudinally spaced parallel planes and respectively adjacent and spaced from end wall 37 and end wall 38, the spacing between rib 42 and end wall 37 being considerably greater than that between rib 43 and end wall 38. The projected extremities of ribs 42,43 are co-planar and the plane thereof is parallel to base 41.

Each of the corners of the outer surface of shell 40 at the lateral extremities of end wall 37 has therein a generally vertically directed groove 44 which extends from base 41 to a point short of its outer limit, at which point it is interrupted by a limited flange 45. Flange 45 is parallel to base 41 and has therein a tapped aperture accomodating a captive screw 46 the head of which is below the flange and the body of which projects upwardly, outwardly from and perpendicular to the flange and the upper plane of shell 40. Opposite end wall 38 has a similar vertically directed groove 44 in the apex portion of its outer surface, similarly interrupted by a flange 45 having a similarly applied screw 46. Flanges 45 and screws 46 are triangularly related.

That end of base 41 which merges with the base of end wall 38 has therein two very small generally rectangular offset portions positioned thereby in elevated relation to its lowermost surface. These offsets are respectively in immediately adjacent spaced relation to the corners of base 41 and each is provided with a very narrow, short, laterally extended slot 48, the purpose of which will be further described. Each of the side walls 34 and 35 have at their upper edges a single, very shallow, rectangular notch 49 the lateral extent of which is quite short. Notches are identical, transversely aligned and the respective opposite ends of rib 43 are immediately below their respective base portions. The purpose of slots 48 and notches 49 will also be further described.

A significant element of the illustrative embodiment is a generally planar, generally rectangular gear plate 50 having a right angled bend adjacent, spaced from and parallel to one end. Plate 50 has a length and configuration to extend from end wall 24, in substantially bridging relation to the projected limits of side walls 21, 22 of shell 18 to and over the projected edge of partition 25, at which point its bentover end portion 51 projects outwardly from shell 18 perpendicular to the plane of the projected extremity of its wall structure 21–24. Gear plate 50 caps in the neighborhood of 80% of the cavity defined in shell 18. The outwardly facing surface of plate portion 51 mounts, transversely thereof, a terminal strip 52, releasably connected thereto by screws.

Lodged in an aperture 53 in plate 50 at a location adjacent and spaced from end wall 23 and centered between side walls 21, 22 is a flanged tubular bushing 54 the flange of which abuts the inwardly facing surface of plate 50. Bearing for rotation in bushing 54 is an elongated output shaft 55. A short intermediate portion 59 of the length of shaft 55 is radially enlarged to form thereon oppositely facing radial shoulders one of which abuts and limits against the flange of bushing 54. Portion 59 is distinguished by a pair of diametrically opposite parallel flats 66 and mounts thereabout, for rotation therewith, a gear 85 having a complentarily shaped central opening a bearing support and backing for which is provided by plate 50. As plate 50 is applied to and over the cavity of shell 18 the major portion of the length of shaft 55 including portion 59 thereof projects therefrom and perpendicular thereto to have its projected extremity project through boss 33 and position beyond surface 14 of shell 18, within and central to its integrated wall structure 30. At the same time a raised portion of the inwardly facing surface of plate 50 which has a central aperture therein is aligned with and has projected therethrough the reduced diameter projected extremity of pin 47. The radial shoulder formed inwardly of the projected extremity pin 47 seats to plate 50 which as a result thereof provides it with an underlying bearing support and causes the composite gear 42 which mounts for rotation on pin 47 to be placed in mesh with gear 85.

The opposite end portion of shaft 55 extends through and beyond bushing 54 to mount thereon and thereabout a sleeve type worm gear 57. Gear 57 is releasably secured in end abutted relation to bushing 54 and to the shaft which projects therethrough. Releasably secured to and about the diametrally reduced outer extremity of shaft 55 immediately of the outer end of gear 57 is an annular four pole magnet which rotates in correspondence with the rotation of the related shaft.

End portion 64 of shaft 55 includes, at a point adjacent and spaced from its outer extremity, a diametral throughbore accommodating a press fit pin 65 which provides it with a "T" shape.

Worm gear 57 meshes with a pinion 60 fixed to one end of a lead screw 61. Screw 61 is positioned in an underlying spaced parallel relation to the overlying functionally extended planar portion of gear plate 50 to have one end thereof extend through and in threaded bearing relation to suitable means provided in connection with gear plate portion 51 and its other end extend through and in bearing relation to a bracket 50' which is an integral part of and fixed to depend from and perpendicular to the outwardly facing surface of plate 50. Lead screw 61 is suitably contained to rotate in place, projects through and mounts thereon, for movement along the length thereof, between plate portion 51 and bracket 50', a nut 63. An integrally formed laterally directed extension 67 of nut 63 is in the inoperative condition of screw 61 spaced from and in line with a scale 70 marked along the adjacent longitudinally extending side edge of plate 50. Extension 67 has a throughbore parallel to lead screw 61 accommodating the projection therethrough of a longitudinally extending small diameter rod 68 which may be fixed by a set screw 69 in a selected axially adjusted position with respect to the nut, in accordance with the nature of its intended application. In the adjustment thereof that end of rod 68 remote from plate portion 51 is in a start position and optionally set to have its projected extremity coincide with that point on scale 70 which will insure a particularly desired stroke of the actuator.

Releasably fixed to the outer surface of plate 50 immediately adjacent the end thereof adjacent end wall 38 is a switch 71 the operator of which projects therefrom in a direct alignment with and in the path of projected extremity of rod 68 as it moves along the lead screw from a start position to the limit of its travel, at which point it will engage the switch operator. A second limit switch 72 is similarly releasably connected to the outer surface of plate 50 immediately of its bentover portion 51 to position the operator thereof to be abutted by the nut in its start position and serve as a control for the circuit in which the switches are enbodied prior to the actuation of the nut in response to a remote signal indicating the requirement for the use of the actuator to serve its intended purpose. Utilizing appropriate wiring, switches 71 and 72 are included in an appropriate conventional circuit to meet the requirements of the application of the actuator, the necessary power being simply and easy introduced by way of terminals of strip 52.

Releasably mounted on the outer surface of plate 50 at the side thereof remote from lead screw 61 and adjacent end wall 24 is a right angled sensor bracket. This bracket includes a longitudinally extending base strip 90 running essentially parallel to the projected edge of front wall 21 and almost to the end of plate 50 immediately of end wall 24. Each of the ends of strip 90 is provided with an identical laterally centered longitudinally directed notch within and intermediate the length of which is positioned the body of a screw which projects through plate 50, in one case to threadedly engage in a tapped blind bore formed in a rib in connection with the inner surface of end wall 24 and in the other case to pass through and in threaded engagement with plate 50. These screws are employed to clamp strip 90 in place and, as and when necessary, be eased to allow a limited longitudinal movement of the strip, subsequent to which it is clamped in its newly set position. Bent to project outward from and perpendicular to the plane of strip 90 is the sensor mounting portion 100 of the bracket which is shorter than and longitudinally centered with respect to strip 90.

FIGS. 9–11 illustrate a unique arrangement by which two sensors are mounted to the bracket and may be alternatively used as and when desired. FIGS. 9 and 11 reveal the use of a potentiometer 95 which as mounted to the bracket portion 100 is so oriented that a gear 97 in connection with the projected rotatable shaft 96 thereof is placed in mesh with worm gear 57 which is of course simultaneously in mesh with pinion 60 of lead screw 61. At this point the multiple pole magnet 98 when and as energized concurrently with the worm gear and shaft 55 rotates cyclically and in the course thereof is simultaneously passing over gear 97 and sensor device 100 which in this case is related to a reed printed circuit board. If one wishes to switch from a the use of the potentiometer, all one has to do is to loosen the screws holding the strip 90 in place and shift strip 90 to displace gear 97 from gear 57 and by virtue of this bring the reed switch into play, in obvious manner, to sense the period of rotation of shaft 55, achieve the required count and transmit signals thereof to such remote equipment as governs the requirement for energization. It will of course be obvious that to effect the scanning required one may substitute an optical scanner for that illustrated.

Particular attention is directed to the fact that in the embodiment illustrated virtually all the elements assembled to plate 50 and/or within the housing 15 are installed and positioned by slip, press or drop fit and basically releasable, one from the other and from their housing, by the simplest of tools. Their mount is by hand and a fixed relation of parts is substantially achieved using common screws. This is rendered self evident by the accompanying drawings alone. Note also that on the release and removal of either one of the two shells defining the housing 15, all components present themselves in the open and for easy access. The sum and substance of these facts makes it clear that singular invention is dispayed in all its simplicity.

The above comments are clearly supported by the foregoing. For example, to this point the detailed reference to applicant's disclosure evidences the fact that one of the two half parts essentially has installed therein the total complement of that which is required to provide a package demanding no more than a cap for its outdoor use. As should be self evident the plate 50 and the assembly of components which releasably mount thereon can be and are integrated functionally in the shell 18 as required by a simple and quick by application of three screws through apertures in plate 50 to tie plate 50 to shell 18 and thereby contain all elements in a captive functional relation. Now, when this is done, a further feature of the invention is that by a simple drop fit of plate 50 and all attached thereto into the cavity defined by shell 40, the plate 50 need simply be rested on the co-planar projected limits of ribs 42 and 43 with one end immediately of end wall 38 to thereby cap the major extent of the cavity of shell 40 and produce a significant benefit not only in this respect but also in that its bentover end portion 51 at the same time defines a utilitarian cavity one side of which is defined by a terminal strip to which easy access may be had for installation and storage of wires and quick inspection and maintenance thereof. The fact that everything may be virtually instantaneously reached by virtue of the totality of the support function of plate 50 in and of itself declares the existence of novelty in the present invention as does the functional reality of its compact assembly of parts wherein each part can be reached, handled and serviced without danger of damage to others. Considerable savings and durability of embodiments of this invention is an inherent feature thereof.

As is implicitly obvious, once the assembled plate 50 as above described, whether alone or together with other apparatus, is drop fit as an integrated supporting device in shell 40, the two parts of housing 15, the receptacle and its cap, are obviously tightly securable with a gasket or seal therebetween, where necessary. All this may be done easily and very quickly. The result is an end product which in the use thereof will prove to be a sturdy and reliable inexpensive versatile power transmission control assembly capable of being presented in many modfications and embodiments and being adaptable for use in a variety of applications.

As demonstrated for use in application to an outdoor TVRO antenna the illustrated embodiment is completed by application of motor 11 and actuator assembly 10.

Motor 11 per se is simply and conventionally constructed to include a cylindrically configured housing evidencing a cylindrically formed plug shaped projection from and central to one end thereof through which projects in bearing relation thereto its drive shaft the projected end portion of which has the form of a pinion M. As seen in FIG. 1, motor 11 is easily, quickly, stably and firmly end mounted to seat on wall structures 38 and 39 on inserting the projected plug shaped bearing portion thereof within the socket peripherally defined by wall structure 38 and in the course thereof directing pinion M through the thus aligned aperture 27 in base 19 to mesh with the compound gear 82 whereupon motor M is then secured by its mounting bolts, in obvious manner, to rise from and perpendicular to the surface portion 14 of base 19 of shell 18.

The actuator assembly is in this case applied to its seat utilizing a shell-like tubular adapter 110 which has a short portion of its length, that in this instance provides its base, cylindrically formed while the remainder of its length is in the shape of a truncated cone. This cone is provided with a longitudinally extending coextensive slit and a pair of diametrically aligned notches in its base which are offset 90 degrees from the slit and open therefrom at its base.

The actuator assembly per se is comprised of an outer tube 112 having a base end by which it is mounted adjacent and spaced from which is a first pair of diametrically aligned notches 108 and in closely spaced relation thereto, in the direction of the remote end of the tube, an identical pair of diametrically aligned apertures 107. Telescopically mounted within and in bearing relation to the inner surface of the outer end of tube 122 is an actuator tube 114. The end of tube 114 remote from the base end of tube 112 is plugged and capped by a securely interconnected coupling element 115 the outwardly projected extremity of which is linked in use, in the example illustrated, in pivotally connected relation to means provided on and forming part of a parabolic TVRO outdoor antenna such as demonstrated in FIG. 1 of the drawings. Positioned within and located interiorly of a portion of the length of the actuator tube 114 is a rod 116 incorporating a longitudinally extended lead screw. A portion of rod 116 remote from the outer end of tube 114 is threaded through a sleeve 117 having a fixed connection with the innermost end of tube 114. Spaced inwardly of the innermost end of tube 114, at a location inwardly of sleeve 117 is a second sleeve 119 peripherally connected with tube 112 at a location adjacent and outwardly of the location of apertures 107. Interposed between sleeves 117 and 119 and in abutment with the surface of sleeve 119 remote from sleeve 117 is, in each case, a bearing assembly 120 through which the innermost end portion of rod 116, which is free of thread, passes to extend within a tubular element 122 and terminate intermediate its length. Tube element 122 has a pair of diametrically aligned apertures intermediate its ends which align with a diametral bore in element 116 to commonly receive therein a press fit pin 123 which links rod 116 thereto. The innermost end of element 122 which is beyond the end portion of rod 116 which is linked thereto is provided with a pair of diametrically aligned notches which in the application of the actuator tube assembly 10 receive the projected extremities of pin 65 providing a T-shape to end portion 64 of the output transmission shaft 55.

Prior to the mount of actuator tube assembly 10 the base end portion of the outer tube 112 is thrust inwardly of the apex end of adapter 110 to position therein, the length thereof, in a frictionally coupled relation thereto. At this point adapter 110 and its coupled base portion of tube 112 are inserted in the spaced defined between wall structures 30 and 31 to a point adjacent and spaced from surface 14 of base 19 of shell 18. In the process of the application of adapter 110 and the base end portion of tube 112 contained thereby notches 109 in the base end of adapter 110 and apertures 108 in tube 112 are aligned with tapped radial apertures in wall structure 31 to commonly receive therein the body of a pair of diametrically opposed screws by means of which tube 112 and correspondingly the actuator assembly are pulled into the mounting structure 117 and thereby rigidly connected to housing 15 to rigidly and most stably mount in projected relation to this housing.

Prior art has never considered the actuator mounting as a source of an integral strength factor. This new design for an actuator mount per the present invention because of the dual fastening arrangement as here provided, from the body into the tube, causes the tube to become, in effect, an integral part of the body, which creates a far stronger assembly than has been heretofore provided. All prior designs use a singular mounting bolt which merely serves to retain the tube in a proper axial and radial position.

The outermost end of the screw portion of rod 116 which positions within the length of tube 114 is provided with a peripherally bounding bearing seal 111 and a further seal is provided at the outer end of tube 112 which overlaps its extremity to bear against and about the outer surface of inner tube 114.

The construction and application of actuator assembly 10 as well as that of motor 11 not only firmly and functionally interrelate the motor with and in driving relation to screw 116 the rotation of which is effective, selectively, to linearly project and retract the actuator and correspondingly adjust the orientation of antenna P within its dimensional limits but also provide that the motor and in particular the actuator assembly are most stably intergrated with the gear head to which they mount.

Note in particular, that the form, nature and application of adapter 110 is such to accomodate and enable the containment of actuator tubes which differ in diameter, within a reasonable range of dimensions.

What becomes distinctively evident on inspection when this assembly is achieved is that the construction of the gear housing 15 is such to enable the continuing and quick removal therefrom of that moisture and condensation which may occur in motor 11 during its usage in an outdoor environment. Evacuation of water and moisture is similarly and effectively facilitated by reason of the base construction and mount of the actuator assembly. Motor 11 is provided at the lower end thereof, in the base of structure 16, with apertures 27 and 28 as well as an aperture 29 through which water in any form may pass to the interior of the cavity defined by shell 18 and inherently move from there to and along inner wall surface portions of shell 40 and readily pass therefrom through the slots 48. At the same time take particular note of the construction and mount of the actuator assembly wherein, facilitated by the nature of the elevated mount of the base of the actuator with reference to surface 14 and the form thereof, a quick evacuation from assembly 10 of water is inherently provided in a manner that insures such dispersion is clear of the operating elements involved in the composition of the structure exemplified by the illustrated embodiment of the invention.

As to the details of the actuator construction and the controls utilized, only so much thereof has been described as would be necessary for the understanding of their operation by those versed in the art.

An adapter A plugged into and in threaded engagement with end wall 23 is utilized for the connection to the apparatus of the invention of a remote source of electrical energy to power the motor and for the operation of the interior controls of the system illustrated. As will be obvious, the motor and the included electrically energized controls are interrelated by way of the terminals in strip 52 to link them in a circuit appropriately responsive to signals for operation of the antenna P which are directed to them from a remote source.

As mentioned previously, it should now be clear that the invention affords a definite advance in the art in providing a power transmission and control unit wherein within a simplistic housing defining a single cavity there are releasably provided all the operative components thereof, which components are mutually supported by a single simple easily removable gear plate in a universally exposed, individually accessible relation. The invention contributes a most efficient and compact functional positioning of the parts with beneficial advantages including not only a maximally insured efficient operation of that to which they relate, but long operating life for the system of which they form a part. The drop fit nature of the gear plate and the elements which they support within the interior of housing 15 is enhanced by the relative arrangement and connection of the shells which afford ease of application of any wiring that may be required to interrelate the included controls.

A further important consequence of the invention is that all connections of parts of the invention embodiments, are positive quickly releasable and require the use of the simples of tooling to enable maintenance, inspection or substitution thereof in the field. An inobvious feature of the gear plate is that it is extremely simple and inexpensive to manufacture and insures the precise alignment required for the transmission gearing within housing 15 in an inexpensive fashion and avoids in its use the usually imposed need for efforts to adhere to precision tolerances usually encountered in the fabrication of units of the type here described.

A most inobvious feature of the invention is that all of the slots and vents provided in the construction of housing 15 are narrow and rectangular as well as limited as to their longitudinal extent. It has been found that such configurations of the slots avoid the usual blocking thereof by debris normally encountered in use of apparatus of the prior art. In this connection it has been discovered in test in the course of development of this invention that insects do not pass through or build nests in slots or apertures of this configuration. The result thereof is to insure continued free passage of water from the housing of the gear head in the natural course of its use. Mention must also be made of the slots defined by the notches 48 and 20 which in the connection of shells 18 and 40 become similarly configured slots which in this instance provide air vents for control of the pressure and atmospheric conditions within the gear head.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Actuator apparatus especially advantageous in application to outdoor antennas, particularly TVRO parabolic antennas, to be operated by remote control, comprising a tub-shaped receptacle including a base having a peripherally encompassing relatively projected wall structure defining therewith a cavity, said wall structure being transversely bridged in part by a releasably confined plate releasably connected to one surface portion of which is a terminal strip adapted for the connection thereto of a remote source of electrical energy, said plate mounting thereto for rotation thereon a perpendicularly related shaft one end portion of which projects in the direction of said base, means releasably connected with and defining a cap for said receptacle forming therewith a housing having an opening in line with said shaft the opposite end portion of which is projected in the vicinity of the outermost surface of said cap for access thereto and a slip fit coupling thereof to an actuator exterior to said housing, said terminal strip providing means for the electrical connection thereto of a drive motor external to said housing, gear means having a slip fit coupled relation to said shaft intermediate said plate and said cap, said gear means positioning immediately of said plate and being geared to further gear means intermediate said plate and said cap a portion of which is in bearing relation to a pivot pin mounted within and in connection with one of said plate and said cap, an opening in said cap through which access is provided for coupling the drive shaft of the exterior motor in driving relation to said gear means, and control means to provide for incremental periods of rotation of said shaft releasably connected to a further surface portion of said plate and operatively connected to said shaft, said control means being in a circuit including the exterior motor on their common electrical connection with said terminal strip, to which a external source of electrical energy is connected to provide for selective limited periods of operation of said motor and said shaft as and when required.

2. Apparatus as in claim 1 wherein said cap is also a tub-shaped receptacle which is inverted as it is placed in capping relation to the first said receptacle and releasably coupled thereto to define a chamber the remote limits of which are defined by the base portions of said receptacles which are parallel and said receptacles have a generally oblong configuration and said plate provides a common support for substantially all of the elements which are contained within the limits thereof.

3. Apparatus as in claim 1 wherein said receptacle has a generally rectangular oblong shape, the projected ends of said base of which are similarly arcuately rounded and said projected wall structure include side wall portions which are longitudinally extended and coextensive in length with that of the longitudinally extended side edges of said base and the end wall portions of said wall structure are arcuately rounded in transverse section and diverge as they project from said base.

4. Apparatus as in claim 1 wherein said plate provides an underlying support for said pivot pin, means formed integral with said cap mount an electric motor and an actuator assembly directly on the exterior of said cap, in a side by side spaced relation and perpendicular thereto, said actuator mounting means including concentric tubular projections between which is mounted the base of an upwardly convergent tubular adapter formed to telescopically receive and closely and securely contain a base end portion of said assembly, means interrelated with and forming a fixed connection between said mounting means, said tubular adapter and the outer tubular wall portion of said assembly operative to draw said assembly down to virtually integrate it with said cap and the projected end portion of said shaft embodies means to telescopically slip fit to and engage in driving relation to an end portion of an axially projectable and retractable actuator tube unit mounted within and in bearing relation to said outer wall portion of said assembly.

5. Apparatus as in claim 1 wherein said plate provides an underlying support for said pivot pin, means formed integral with said cap mount an electrical motor an extension of the drive shaft of which has the form of a pinion, said extension projecting through said aperture and positioning in a geared relation a further and an actuator assembly directly on the exterior of said cap, an aperture in said cap, said motor having a drive shaft an extension of which includes thereon a pinion which on mount of said motor automatically disposes in meshing relation to said further gear means, an additional aperture in said cap overlying said further gear at a point intermediate its radial limits and a plurality of small, narrow, oblong slots in the base of said receptacle in portions of its outer limit the form of which is such to inhibit the blocking thereof or the building of nests therein by insects and providing thereby, together with said additional aperture for a continuing exit and drain therethrough of such moisture and condensation as may otherwise accumulate in said motor and said receptacle.

6. Actuator apparatus especially advantageous in application to outdoor antennas, particularly TVRO parabolic antennas, to be operated by remote control, comprising a tub-shaped receptacle including a base having a peripherally encompassing relatively projected wall structure defining therewith a cavity, said wall structure being transversely bridged in part by a releasably confined plate releasably connected to one surface portion of which is a terminal strip adapted for the connection thereto of a remote source of electrical energy, said plate mounting thereto for rotation thereon a perpendicularly related shaft one end portion of which projects from one face thereof in the direction of said base, said base having an opening for access to and a slip fit coupling of said shaft to an actuator exterior to said housing, the opposite end portion of said shaft being projected from the opposite surface of said face, said terminal strip providing means for the electrical connection thereto of a drive motor external to said housing, gear means having a slip fit coupled relation to said shaft intermediate said plate and said base, said gear means positioning immediately of said plate and being geared to further gear means intermediate said plate and said base a portion of which is in bearing relation to a pivot pin mounted within and in connection with one of said plate and said base, an opening in said receptacle through which access is provided for coupling the drive shaft of the exterior motor in driving relation to said gear means, and control means to provide for incremental periods of rotation of said shaft releasably connected to a further surface portion of said plate and operatively connected to said shaft, said control means being in a circuit including the exterior motor on their common electrical connection with said terminal strip, to which an external source of electrical energy is connected to provide for selective limited periods of operation of said motor and said shaft as and when required.

7. Apparatus as in claim 6 wherein a further receptacle defining a cavity is releasably connected to the first said receptacle to define therewith a shell-like housing, said plate is drop fit to said further receptacle which forms a cap for said plate and said base of said first mentioned receptacle has means in connection therewith mounted to rise upwardly therefrom to couple an end portion of an actuator to said base and effectively stably mount said actuator in a relatively integrated relation to said first mentioned receptacle.

8. Apparatus as in claim 7 wherein said means coupling an end portion of an actuator to said base is a conical adapter which mounts in a slightly elevated relation to said base, said end portion of said actuator is frictionally fit within at least a portion of the axial length of said adapter and means are provided in connection with said base to laterally apply to and tightly set said contained portion of said actuator in a rigidly connected perpendicular relation to said base to reciprocally achieve a strengthening of said first mentioned receptacle and said housing thereby.

9. Apparatus as in claim 8 wherein said means in connection with said base of said first mentioned receptacle stably mounts said actuator to have the end thereof adjacent said base elevated with respect to said base and defines with said end of said base a path for water which may enter said actuator to inherently self evacuate therefrom.

10. Apparatus as in claim 7 wherein at least one of said receptacles is provided with narrow notches at the edge of that portion thereof which is releasably connected to the first said receptacle to define therebetween relatively minute narrow slots the form of which is such to virtually preclude the blocking thereof and entrance therethrough to the interior of said receptacles of insects of other undersirable elements, thereby to provide vents for control of the air pressure within the area between said receptacles.

* * * * *

UNITED STATES PATENT AND TRADEMARK OFFICE
CERTIFICATE OF CORRECTION

PATENT NO. : 4,918,363
DATED : April 17, 1990
INVENTOR(S) : Russell E. Hollis; Paul R. Hollis It is certified that error appears in the above-identified patent and that said Letters Patent is hereby corrected as shown below:

Col. 1, line 20, a comma is inserted following "elements";

line 64, a comma is inserted following "selectively".

Col. 8, line 46, "complentarily" is corrected to read
-- complementarily --.

Col. 9, line 49, "enbodied" is corrected to read -- embodied --;

line 55, "easy" is corrected to read -- easily --.

Col. 10, line 23, delete "a";

line 57, delete "by" (second occurrence).

Col. 15, line 13, (Claim 1, line 37) "a" is corrected to
read -- an --.

Signed and Sealed this

Twenty-eighth Day of May, 1991

Attest:

HARRY F. MANBECK, JR.

Attesting Officer

Commissioner of Patents and Trademarks